United States Patent
Bouzguarrou et al.

(10) Patent No.: US 12,405,800 B2
(45) Date of Patent: Sep. 2, 2025

(54) BRANCH PREDICTION BASED ON A PREDICTED CONFIDENCE THAT A CORRESPONDING FUNCTION OF SAMPLED REGISTER STATE CORRELATES TO A LATER BRANCH INSTRUCTION OUTCOME

(71) Applicant: Arm Limited, Cambridge (GB)

(72) Inventors: Houdhaifa Bouzguarrou, Austin, TX (US); Rami Mohammad Al Sheikh, Morrisville, NC (US)

(73) Assignee: Arm Limited, Cambridge (GB)

( * ) Notice: Subject to any disclaimer, the term of this patent is extended or adjusted under 35 U.S.C. 154(b) by 38 days.

(21) Appl. No.: 18/428,334

(22) Filed: Jan. 31, 2024

(65) Prior Publication Data
US 2025/0245012 A1    Jul. 31, 2025

(51) Int. Cl.
*G06F 9/38* (2018.01)
(52) U.S. Cl.
CPC .................. *G06F 9/3844* (2013.01)
(58) Field of Classification Search
CPC .................................................. G06F 9/3844
See application file for complete search history.

(56) References Cited

U.S. PATENT DOCUMENTS

| | | | |
|---|---|---|---|
| 2020/0089504 A1* | 3/2020 | Al Sheikh | G06F 9/3848 |
| 2021/0279063 A1* | 9/2021 | Vasekin | G06F 9/3865 |
| 2021/0326139 A1* | 10/2021 | Gupta | G06F 9/30145 |
| 2023/0088780 A1* | 3/2023 | Williams | G06F 9/342 |
| | | | 710/20 |
| 2023/0297381 A1* | 9/2023 | Keltcher | G06F 9/3455 |
| | | | 712/240 |
| 2023/0401135 A1* | 12/2023 | Chen | G06F 11/3471 |

\* cited by examiner

*Primary Examiner* — Courtney P Spann
(74) *Attorney, Agent, or Firm* — NIXON & VANDERHYE P.C.

(57) ABSTRACT

An apparatus comprises sampled state storage to store sampled values of at least one register operand sampled at a sampling point in program flow, and a correlation prediction table to store at least one correlation prediction entry, each correlation prediction entry providing at least one confidence indication for a corresponding branch instruction, and each confidence indication indicating a likelihood that a corresponding function of register state sampled at the sampling point correlates to a branch outcome for the corresponding branch instruction. The apparatus comprises prediction circuitry to make a prediction of a branch outcome for a particular branch instruction based on performing a particular function of register state sampled at the sampling point, the particular function corresponding to a confidence indication, meeting a prediction criterion, in a corresponding entry of the correlation prediction table.

20 Claims, 10 Drawing Sheets

BRANCH PREDICTION BASED ON A PREDICTED CONFIDENCE THAT A CORRESPONDING FUNCTION OF SAMPLED REGISTER STATE CORRELATES TO A LATER BRANCH INSTRUCTION OUTCOME

BACKGROUND

Technical Field

The present technique relates to the field of data processing. In particular, the present technique relates to branch prediction.

Technical Background

A data processing apparatus may execute branch instructions which determine which sequence of later instructions will subsequently be executed. The apparatus may have a branch predictor for making branch predictions for predicting outcomes of branch instructions during execution of a program. This allows the data processing system to speculatively fetch and execute later instructions on the flow path indicated by the predicted outcome of the branch instruction. Speculative execution of instructions in this way allows the later instructions to be executed sooner than would be possible if the data processing system was forced to wait until the outcome of the earlier branch instruction was known, which may improve the performance of the data processing system. If the prediction of the outcome of a branch instruction is later determined to have been incorrect, the later instructions executed from the incorrect path are flushed from the pipeline of the data processing system, with the data processing system then executing instructions on the correct control flow path.

It is desirable to develop prediction mechanisms that increase the accuracy of prediction of the outcome of branch instructions, as the more accurately the prediction mechanism operates, the less need there will be to flush instructions from the pipeline, and hence the performance impact of incorrect predictions will be reduced.

SUMMARY

At least some examples of the present technique provide an apparatus, comprising:
  sampled state storage configured to store sampled register state of at least one register operand sampled at a sampling point in program flow;
  a correlation prediction table to store at least one correlation prediction entry, each correlation prediction entry providing at least one confidence indication for a corresponding branch instruction;
  wherein each confidence indication indicates a likelihood that a corresponding function of register state sampled at the sampling point correlates to a branch outcome for the corresponding branch instruction when said branch instruction is executed at a later point in program flow; and
  prediction circuitry, wherein in response to a determination that a particular branch instruction later in program flow than the sampling point has a corresponding correlation prediction entry and that the corresponding correlation prediction entry provides a confidence indication meeting a prediction criterion, the prediction circuitry is configured to make a prediction of a branch outcome for the particular branch instruction based on performing a particular function of register state sampled at the sampling point, the particular function corresponding to the confidence indication meeting the prediction criterion.

At least some examples provide a method, comprising:
  storing sampled register state of at least one register operand sampled at a sampling point in program flow;
  storing at least one correlation prediction entry, each correlation prediction entry providing at least one confidence indication for a corresponding branch instruction;
  wherein each confidence indication indicates a likelihood that a corresponding function of register state sampled at the sampling point correlates to a branch outcome for the corresponding branch instruction when said branch instruction is executed at a later point in program flow; and
  in response to a determination that a particular branch instruction later in program flow than the sampling point has a corresponding correlation prediction entry and that the corresponding correlation prediction entry provides a confidence indication meeting a prediction criterion, making a prediction of a branch outcome for the particular branch instruction based on performing a particular function of register state sampled at the sampling point, the particular function corresponding to the confidence indication meeting the prediction criterion.

Further aspects, features and advantages of the present technique will be apparent from the following description of examples, which is to be read in conjunction with the accompanying drawings.

DESCRIPTION OF EXAMPLES

Figure 1:
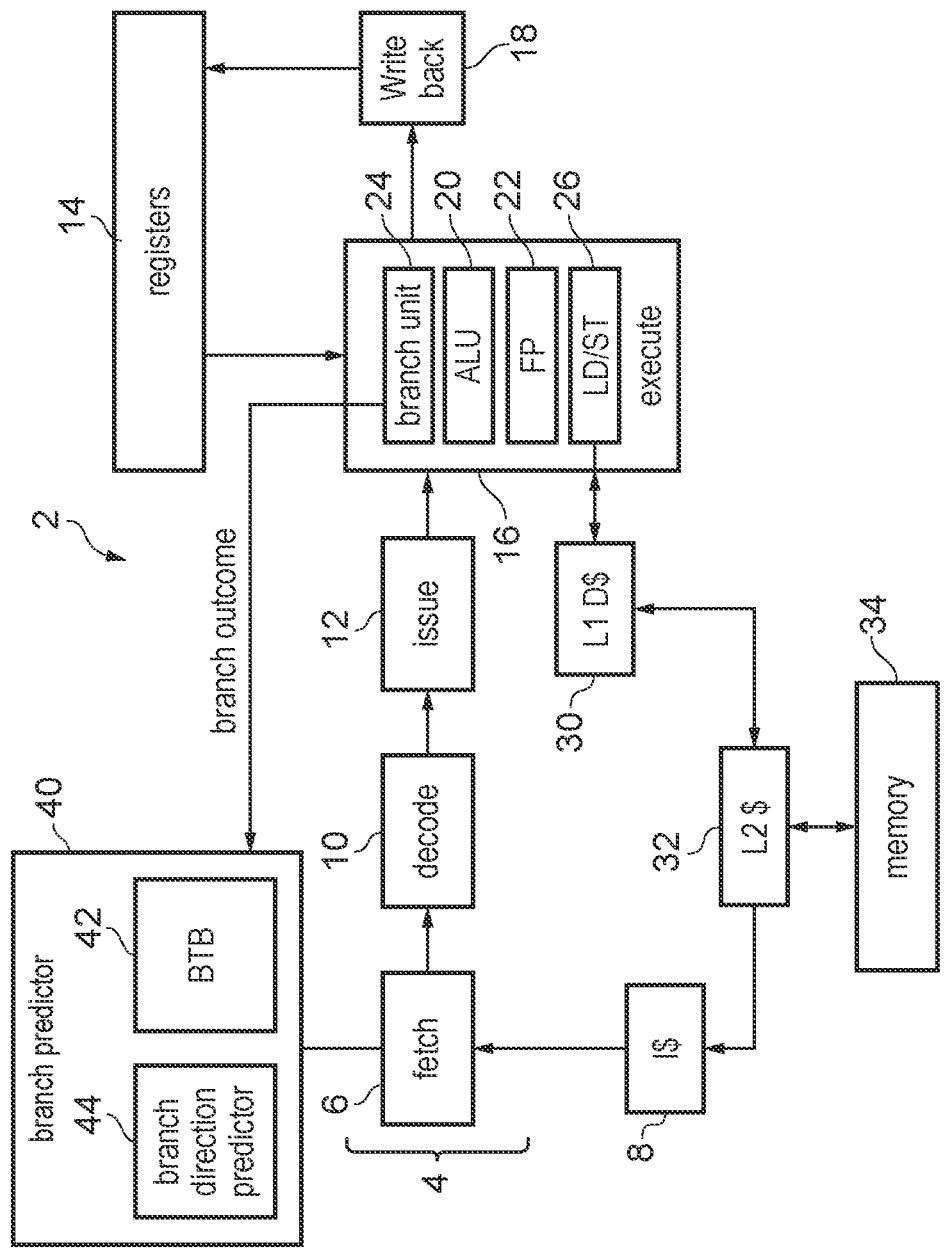
FIG. 1 schematically illustrates an example of a data processing apparatus according to the present technique.

The outcome of a branch instruction may depend on one or more values stored in register storage, which may or may not be explicitly specified by that branch instruction. For example, the outcome of certain branch instructions may depend on a control operand stored in a control register. In other examples the outcome of a branch instruction may depend on an operand stored in a general purpose register, for example a general purpose register specified by the branch instruction. If the outcome of a branch instruction depends on register operands, then accurate predictions could be made regarding the outcome of the branch instruction if it could be known at the time of prediction what values those register operands would have at the time the branch instruction is executed.

One approach to predicting the outcome of a branch instruction could involve sampling the values of registers upon which the outcome of the branch instruction depends at the time of prediction. However, prediction of the outcome of a branch instruction typically takes place many processing cycles before that instruction is executed, with many other instructions executed between prediction and execution of a particular branch instruction. The prediction stage may operate ahead of the execution stage by tens or hundreds of instruction, for example. This means that the values of the register operands at the time of prediction generally vary significantly from the values of those register operands at the later point when the instruction is executed, meaning that it is typically difficult to make accurate predictions about whether a branch will be taken or not taken (predict the branch outcome) based on sampling the current values of register operands at the time of prediction.

The inventors have realised, however, that there are certain points in program flow where the prediction and execution stages become separated by much fewer instructions. For example, as will be discussed below, this may happen following misprediction of a branch instruction leading to the pipeline being flushed. For a period following a pipeline flush, or at other times during processing, there may be relatively few instructions between the prediction and execution stages. Situations where there are a reduced number of instructions between prediction and execution present an opportunity to use values of register operands sampled at the point of prediction to make accurate predictions for upcoming branch instructions, because it is much more likely that sampled values of register operands will be correlated to the future values of the register operands when the branch instruction is executed, and therefore related to the outcome of the branch instruction, since there are fewer intervening instructions which may update those register operands in the period between prediction and execution.

In some situations, it may not be possible to determine at the time of predicting the outcome of a branch instruction exactly what values the register operands will have at the later time when that branch instruction is executed, even if the values are sampled when the prediction and execution stages are close together. Therefore it may not be possible to exactly determine the outcome of the branch instruction based on the sampled register values. However, the inventors have realised that sampled values of register operands may nevertheless be correlated with the outcome of a later branch instruction, and therefore may be used for predicting the outcome of the later branch instruction.

Correlations between sampled register operands and branch outcomes may be complex and difficult to predict. The outcome of a branch instruction may be correlated with a particular function of one or more sampled register operands, such as the combination of two register operands, in a way which may be difficult to anticipate. In examples of the present technique, a table may be trained using a plurality of functions of sampled register state to determine whether any of those functions of sampled register values are correlated with the outcome of a future branch instruction. In response to identifying that a particular function of sampled register state is correlated with the outcome of a branch instruction, that function may be used to make predictions of the outcome of the branch instruction.

According to aspects of the present technique, an apparatus comprises sampled state storage configured to store sampled register state (e.g., current values) of at least one register operand sampled at a sampling point in program flow. To reduce hardware overhead, the sampling may be performed by existing circuitry which already accesses the registers to obtain values of register operands (such as the execute stage of a processing pipeline), although in other examples dedicated hardware may be provided to sample register operands. There are several ways that sampling of register operands may be triggered. In some examples sampling may be a regular event, e.g., occurring every time an instruction is executed. In other examples which enable storage and sampling overhead to be reduced, sampling may be triggered to occur when it is expected that those sampled values may be useful for making branch predictions, such as when a separation (a number of intervening instructions) between the execute and predict stages of a pipeline is anticipated to be small. In some examples sampling of the at least one register operand is triggered by misprediction of a first branch instruction. Sampled registers could include general purpose registers and/or control registers, for example.

In some examples, all of the register operands in a system may be sampled. However, this may lead to an unnecessarily large amount of data being sampled. In other examples, a subset of register operands may be selected for sampling. The subset may include registers upon which branch instructions commonly depend (e.g., a control register such as the current program status register), and/or could include a subset of registers chosen based on the current sampling point. For example, the sampled register operands may include registers which are source or destination registers of instructions preceding the sampling point in program flow, as these may be the registers which are most likely to be related with the outcome of an upcoming branch instruction. The choice of which registers to sample may be predetermined, it could be determined by the sampling circuitry based on decoding a particular sequence of instructions, or it may be determined in some other way.

The apparatus also comprises a correlation prediction table to store at least one correlation prediction entry. Each correlation prediction entry corresponds to a particular instance of a branch instruction. As discussed below, the correlation prediction entry may also correspond to a particular combination of first and second branch instructions encountered in a particular sequence, and therefore there may be more than one entry for a particular branch instruction.

Each correlation prediction entry provides at least one confidence indication. Each confidence indication indicates a likelihood that a particular function of register state sampled at the sampling point correlates to a branch outcome for the branch instruction corresponding to the correlation prediction entry, when that branch instruction is executed at a later point in program flow than the sampling point in program flow. For example, a particular correlation prediction entry may correspond to a branch instruction at address Y encountered after registers A and B are sampled when the program counter is at address X. The correlation prediction entry could provide several indications, each indicating the likelihood that the outcome of branch Y can be predicted by combining A and B in different ways. For example, an indication may indicate the likelihood that the value obtained by performing the function A+B is correlated to the outcome of the branch instruction Y, a different indication may indicate the likelihood that the value obtained by performing A-B is correlated to the outcome of Y, and so on. The correlation prediction table may be trained based on observed outcomes of branch instructions, as discussed below, and provides a mechanism for identifying ways in which sampled register values can be used to predict the outcome for a branch instruction.

The apparatus also comprises prediction circuitry. In response to a determination that a particular branch instruction later in program flow than the sampling point has a corresponding correlation prediction entry, then that correlation prediction entry may be used to make a prediction for that branch instruction if the correlation prediction entry provides a confidence indication meeting a prediction criterion (e.g., if one of the confidence indications indicates that a particular function of register state is sufficiently closely correlated to the branch outcome of the branch instruction to be used to predict that branch outcome). The prediction circuitry may be configured to make a prediction of a branch outcome for the particular branch instruction based on carrying out a particular function on register state sampled at the sampling point, the particular function corresponding to the confidence indication meeting the prediction criterion. The prediction circuitry may, for example, obtain a value by performing the particular function on the sampled register values, and the value thus obtained may be used to make a prediction. In one example, a lookup based on the particular function may be carried out in a table storing previously observed branch outcomes to provide a prediction.

In the manner described above an apparatus is provided which can be used to identify correlations between functions of sampled values of registers and outcomes of future branch instructions, and predict outcomes of those branch instructions using the sampled register values by performing the identified functions. The predictions obtained in this way can improve accuracy of branch prediction and can therefore lead to improved performance for a data processing system.

In some examples, an encoding of a correlation prediction entry indicates a plurality of confidence indications corresponding to different functions of the register state. By including different functions of register state, then it is more likely that a function will be identified that is correlated with a branch outcome for the particular branch instruction. Whilst the number of different functions is not particularly limited, storage overhead increases with the number of functions used. In practice, a particular limited set of different functions may be used which are most likely to be correlated with a branch outcome, and/or which are relatively simple such that they can be performed without incurring large processing overhead.

If more than one different function is used, then it is possible that more than one function of sampled register state is closely correlated with a branch outcome. In this case, either function could be used to make the prediction. For example, the simplest function may be used. However, in some examples prediction accuracy is increased when in response to a determination that the corresponding correlation prediction entry provides two or more confidence indications meeting the prediction criterion, the prediction circuitry is configured to make the prediction based on performing a function corresponding to the confidence indication indicating the highest likelihood.

The functions of sampled register operand values are not particularly limited, and can include several ways of manipulating and/or combining one or more values of register operands. A function which is particularly simple to implement is the identity function which leaves a register value unchanged. Providing a confidence indication corresponding to the identity function can enable predictions to be made in cases where a branch outcome is directly correlated with a value of a register at the sampling point.

There are several branch instructions which may depend indirectly on more than one register. As an example, the outcome of a branch instruction may depend on a compare instruction (e.g., a branch if equal B.EQ branch instruction depends on a preceding comparison) which compares values loaded from memory. The outcome of a branch instruction may therefore depend on registers indicating memory locations from which the inputs of the compare instruction are loaded, and therefore a branch outcome may be correlated with the values of two (or more) registers. Predictions for such instructions may be made more accurately if a function is used which combines sampled register values from the two (or more) register operands upon which the outcome of the branch instruction depends. Therefore, in some examples the correlation prediction table is configured to provide at least one confidence indication corresponding to a function combining values from a plurality of sampled register operands. The values may be combined by, for example, concatenation, addition, subtraction, and so on.

As mentioned previously, the prediction circuitry performs a function of sampled register state to obtain a prediction. The manner in which the prediction is obtained is not particularly limited, and in some examples a value indicating a predicted branch direction may be obtained directly from performing the function. However, in some examples a table is provided storing previously observed outcomes of branch instructions indexed by the selected function of register state. A hash calculated to look up the table may depend on several factors including the selected function, for example also depending on the address of the branch instruction to be predicted, which registers were sampled, an address of a mispredicted branch instruction which caused the registers to be sampled, an indication of intervening instructions between the mispredicted and predicted branch instructions, and so on. The table therefore allows functions of register state to be used to predict future outcomes of branch instructions, by assuming that the branch outcome should be the same as the last time the branch instruction was encountered in the same scenario. Therefore, some examples comprise a semantic value table configured to store at least one semantic value entry, each semantic value entry indicating a previously observed outcome for a particular combination of a branch instruction and a function of sampled register state. The prediction circuitry may be configured to make the prediction of a branch outcome for the particular branch instruction based on performing a lookup of the semantic value table using the particular function of register state sampled at the sampling point. For example, if an entry is identified in the semantic value table in response to the lookup then the predicted outcome may be the outcome indicated by that hit entry.

To keep the entries in the semantic value table up-to-date, semantic value table update circuitry may be provided. The semantic value table update circuitry may be configured to update the semantic value table based on an observed outcome of a branch instruction. The observed outcome may be the outcome as determined by execution circuitry, for example, when the branch outcome is resolved and is no longer speculative. The semantic value table update circuitry may be responsive to misprediction of a branch instruction to trigger an update of the semantic value table for the correct outcome for that branch instruction, or updates may be carried out more frequently which, although potentially more complex, may enable improved performance.

As mentioned above, sampling of the register values may be triggered at times when it is expected that those values are most useful. For example, registers may be sampled when the number of instructions between the prediction and execution stages of a processing pipeline is small, because this increases the likelihood that a current register value is correlated with a future branch instruction, as there are fewer intervening instructions which may alter the value of the registers between prediction and execution of the branch instruction. Misprediction of a branch instruction causes the pipeline to be flushed, which is one example of a time when there are few instructions between the prediction and execution stages of a pipeline and hence a candidate for triggering sampling of register operand values. As sampling of register values can enable more accurate predictions to be made for subsequent branch instructions, then sampling the register values on a branch misprediction can reduce the likelihood of making two mispredictions back to back (because misprediction of a first branch instruction leads to a situation in which an accurate prediction can be made for the second branch prediction). Hence, sampling register values in response to misprediction of a first branch instruction can reduce the likelihood of back-to-back mispredictions of branch instructions.

The prediction circuitry is configured to make a prediction of the branch outcome for a branch instruction in response to determining that there is a corresponding correlation prediction entry (and in some examples that there is a corresponding semantic value table entry). This determination can be made in several ways. In some examples, the correlation prediction table could be looked up based on the address of the branch instruction to be predicted. However, the same branch instruction may be predicted differently based on different preceding instructions. Hence, it may also be relevant to the predicted branch outcome which instructions preceded the branch instruction (which path was taken to arrive at the branch instruction), and therefore the lookup may also take into account various other values.

In one example, the prediction circuitry may be configured to determine that the particular branch instruction corresponds to a given correlation prediction entry based on a comparison between a path through program flow from the sampling point to the particular branch instruction, and a path indicated in the correlation prediction entry. For example, this could include an indication of intervening instructions between the sampling point and the branch instruction, so that different entries can be provided for different routes to the branch instruction.

In some examples, different entries may be provided for different choices of sampled register operands. Whilst a particular combination of one selection of registers may be correlated to the outcome of a branch instruction, the same combination of a different selection of registers may not, and therefore the correlation prediction entries may be specific to particular selections of sampled register operands. Therefore, in some examples the prediction circuitry may be configured to determine that the particular branch instruction corresponds to a correlation prediction entry based on which operands were sampled at the sampling point.

In some examples where sampling of register operands is triggered by misprediction of a first branch instruction, the prediction circuitry may be configured to determine that the particular branch instruction corresponds to a correlation prediction entry based on the identity of (e.g., the address of) the first branch instruction which triggered the sampling point.

In some examples, the correlation prediction table may be pre-trained on a particular workload, and may remain static at runtime. In other examples, which may enable on-the-fly training, the apparatus may comprise correlation prediction table update circuitry to update the at least one confidence indication of a particular correlation prediction entry, based on a measured branch outcome for the corresponding branch instruction.

For example, if a predicted outcome for a branch instruction based on a particular function agrees with the observed outcome for that branch instruction then the confidence indication for that function may be increased, and vice versa. The likelihood indicated by a particular confidence indication may be increased in response to determining that the particular function of register state associated with the particular confidence indication correctly predicted the branch outcome for the corresponding branch instruction. It will be appreciated that in this context "increased" means that a likelihood is updated to indicate that the function is more likely to be correlated with the outcome of the branch instruction and does not require that a value is made numerically larger (in some examples lower numerical values could imply higher likelihoods).

In an alternative technique which also uses sampled register values to predict the outcome of a branch instruction, intervening instructions between the sampling point and point of execution of the future branch instruction could be "pre-executed" so that the outcome of the branch instruction can be calculated in advance based on determining what values will be had by the registers upon which the branch outcome depends. However, this alternative technique requires that all instructions between the sampling point and the future branch instruction can be executed in advance, and hence excludes the path between the sampling point and the future branch instruction from including instructions such as load instructions which (due to potential intervening updates to memory) cannot be pre-executed. In contrast, the present technique allows the instructions between the sampling point and the future branch instruction to include instructions which are unable to be pre-executed, because the technique is based on statistical correlations between sampled register values and branch outcomes rather than on knowing precise values of register operands at the time of execution of a future branch instruction. Hence, in examples of the present technique the prediction circuitry may be configured to make a prediction for the particular branch outcome irrespective of whether the path through program flow from the sampling point to the particular branch instruction comprises an instruction having an outcome which depends on information other than the sampled register state, and therefore having an outcome which cannot be known before that instruction is executed. This allows coverage of the predictor to be increased, and therefore allows performance of the processor to be improved.

For example, the prediction circuitry may be configured to make a prediction for the particular branch outcome irrespective of whether the path between the sampling point and the future branch instruction includes a load instruction.

In some examples, the prediction criterion may be met for a particular confidence indication when the particular confidence indication has a numerical value exceeding a threshold value. For example, the threshold value may correspond to the prediction accuracy of an alternative prediction mechanism (such as a TAGE predictor), and therefore a particular function of register state may be used to generate predicted branch outcomes only when it is expected that a performance improvement will result. This avoids unnecessary overhead or performance impact of carrying out predictions at times where confidence is low.

Examples will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8, a decode stage 10 for decoding the fetched program instructions to generate micro-operations to be processed by remaining stages of the pipeline, an issue stage 12 for checking whether operands required for the micro-operations are available in a register file 14 and issuing micro-operations for execution once the required operands for a given micro-operation are available, an execute stage 16 for executing data processing operations corresponding to the micro-operations by processing operands read from the register file 14 to generate result values, and a writeback stage 18 for writing the results of the processing back to the register file 14. It will be appreciated that this is merely one example of a possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14, a floating point unit 22 for performing operations on floating-point values, a branch unit 24 for evaluating the outcome of branch operations and adjusting the program counter which represents the current point of execution accordingly, and a load/store unit 28 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

Figure 2:
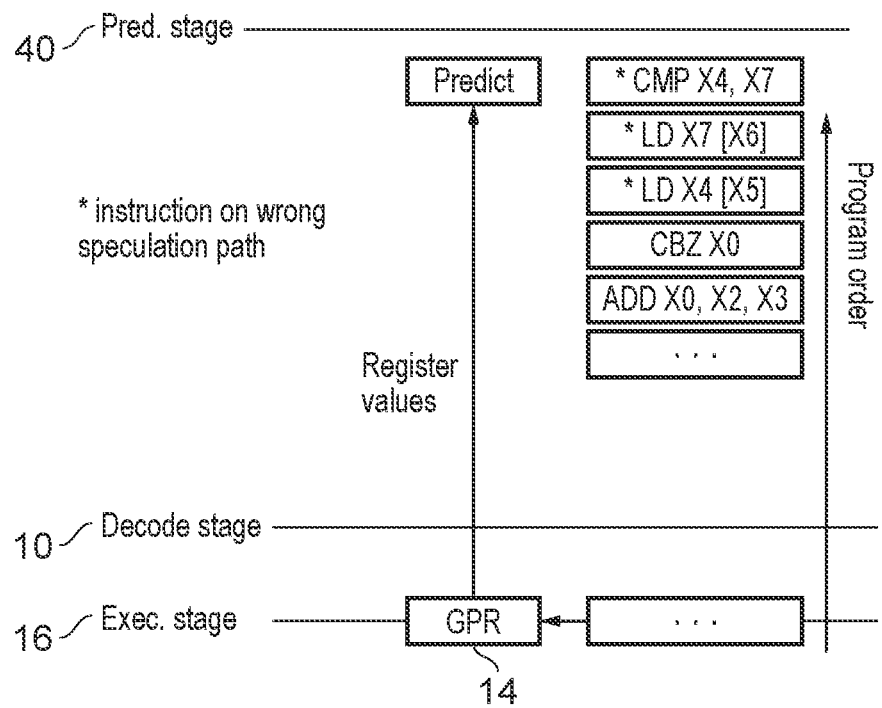
FIGS. 2 and 3 schematically illustrate a series of instructions passing through a processing pipeline.

FIG. 2 schematically illustrates a series of instructions passing through the processing pipeline 4. FIG. 2 shows the prediction stage 40, decode stage 10, and execute stage 16. Registers 14 are shown at the execute stage 16, storing register operands upon which the outcome of branch instructions may depend. A series of instructions is shown on the right hand side of FIG. 2, and it will be appreciated that the instructions logically progress through the stages in a downwards direction (corresponding to a rightwards direction in FIG. 1) starting at prediction 40 and ending at execute 16. As shown by the number of in-flight instructions between the prediction stage and the execute stage, the prediction stage 40 may operate many instructions ahead of the execute stage 16. Only a handful of instructions are illustrated for clarity, but in practice there may be tens or hundreds of instructions in-flight. Many branch instructions have an outcome which depends on values of operands stored in the registers 14, and the inventors have recognised that sampling register operands provides an opportunity to make accurate branch predictions. However, the delay between the prediction and execute stages can lead to difficulties in using sampled register values for prediction as illustrated below.

The instruction CBZ X0 shown in FIG. 2 is a conditional branch instruction, the outcome of which depends on the value of a register operand stored in the registers 14. In particular CBZ is a compare and branch if zero instruction, which will test the value in the register X0 and, only if that value is zero, will branch to a destination indicated in the instruction. At the time the CBZ instruction reaches the prediction stage, the value of register operand X0 is unlikely to be related to the value that X0 will take when the CBZ instruction reaches the execute stage 16. As shown, an instruction which executed after the outcome of CBZ has been predicted may update the value of X0 after CBZ is predicted and before CBZ is executed (in FIG. 2 this is shown as the ADD instruction which updates X0). Generally, the large number of intervening instructions between prediction and execution means that the likelihood of the registers being updated between predicting the outcome of an instruction and that instruction being executed is high, so making a prediction based on the values taken by the registers at prediction time would generally lack accuracy, as those values are typically unrelated to the values of the operands when the instruction is taken. Hence, other prediction mechanisms (such as a TAGE predictor) may be used to predict whether CBZ will be taken or not taken.

Figure 3:
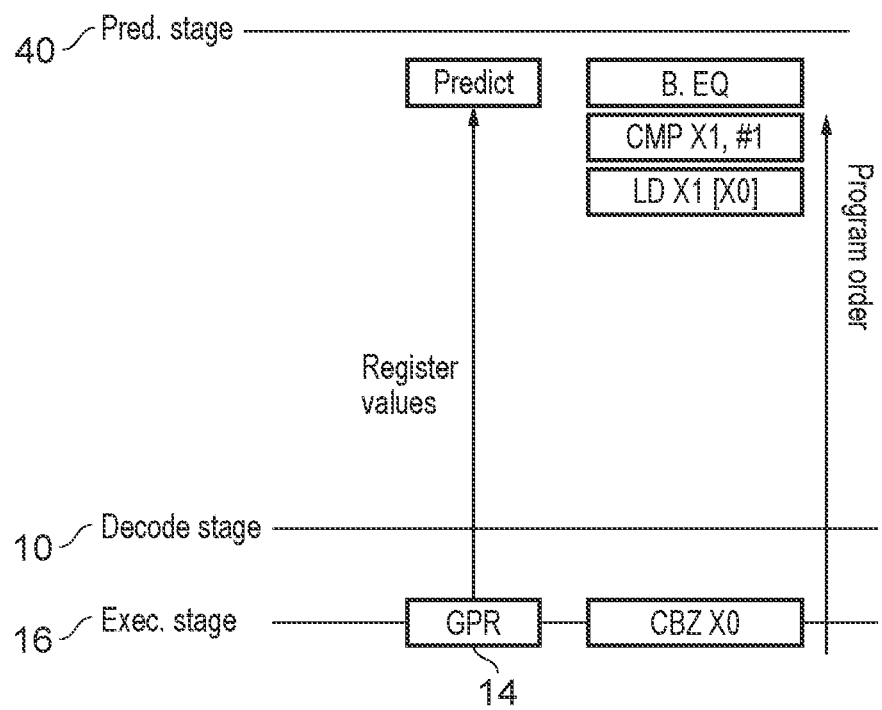

If the instruction CBZ is predicted incorrectly, then the instructions speculatively fetched into the pipeline after CBZ are on the wrong path. When it is determined that the outcome of CBZ was predicted incorrectly (e.g., when CBZ reaches the execute stage), then these instructions will be flushed from the pipeline and subsequent instructions will be fetched instead. Following such a pipeline flush, the prediction stage and the execute stage are synchronized as there are no intervening instructions, as shown in FIG. 3 (note that the instructions following CBZ in FIG. 3 are different from those shown in FIG. 2, as the instructions belong to different paths corresponding to different branch directions of instruction CBZ due to the initial misprediction of CBZ). At this point, following the pipeline flush following misprediction of CBZ X0, the values of the registers 14 at the time of prediction of an instruction are much more likely to be correlated to their values at execution of that instruction, since there are few intervening instructions which could modify the register values between prediction and execution of the instruction. Hence, the inventors have realised that this window of time (before prediction once again gets ahead of execution) provides an opportunity to make predictions in respect of a future branch instruction based on sampled register operand values.

For example, FIG. 3 shows the future branch instruction B.EQ (branch if equal), the outcome of which depends on a control value in a control register (e.g., the zero flag in the current program status register CPSR). The flag will be set by the preceding compare instruction CMP X1, #1, whose outcome depends on the value of the register X1. The value of X1 in turn depends (indirectly) on the value of X0, as it is the result of loading a value from the memory location indicated by the value of register X0.

Given that the path of instructions between misprediction of CBZ and the future branch instruction B.EQ includes a load instruction, the outcome of B.EQ cannot be determined in advance based on the values of registers sampled when CBZ is executed (since the value loaded into X1 cannot be known without carrying out that load). However, there may nevertheless be a correlation between the values of the registers sampled when CBZ is at the execute stage and the branch outcome of B.EQ. For example, if X0 is sampled then the sampled value of X0 indicates the memory location from which a value will be loaded into X1, meaning that the sampled value of X0 is correlated with the value which will be loaded into X1, and therefore is in some way correlated with the outcome of B.EQ (which depends on the value of X1).

Hence, although the outcome of B.EQ cannot be determined exactly based on register values sampled on misprediction of CBZ, those values may nevertheless be correlated with the outcome of B.EQ and therefore may be used to form a prediction of the outcome of B.EQ. Because it is the misprediction of the first branch instruction (CBZ in the example of FIG. 3) which brings the predict and execute stages closer together, misprediction of the first branch instruction provides an opportunity to make a prediction for the future branch instruction (B.EQ) based on the sampled register values. The inventors have realised that the techniques describes herein can reduce back-to-back misprediction of such pairs of branch instructions, because misprediction of the first branch instruction provides the opportunity to make a prediction for the subsequent branch instruction.

Figure 4:
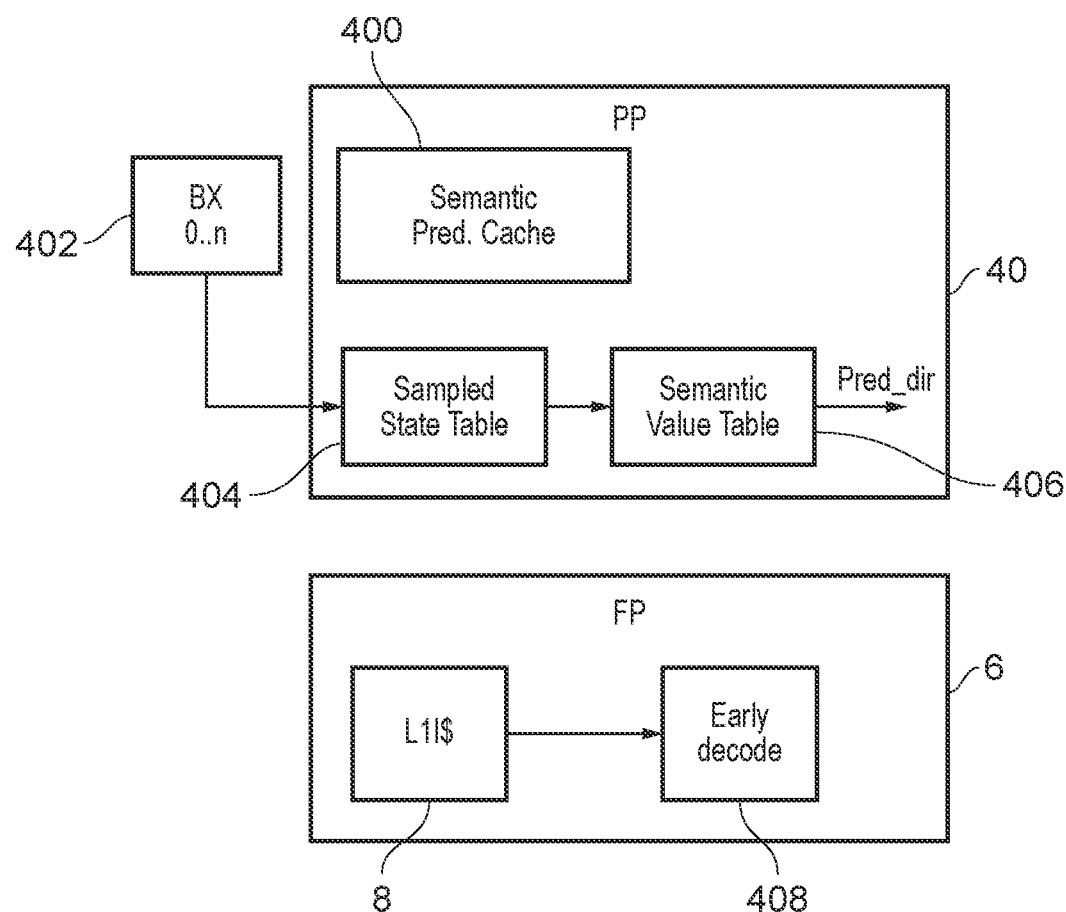
FIG. 4 illustrates an example apparatus according to an aspect of the present technique.

FIG. 4 is a schematic diagram providing an example arrangement for implementing prediction based on sampled register operands. FIG. 4 shows the branch predictor 40 and fetch stage 6 shown in FIG. 1. It will be appreciated that certain features are not shown, to increase clarity. The fetch stage 6 fetches instructions for decoding from the level 1 instruction cache 8, or more generally from the memory system (e.g., if the lookup in the cache misses, the instruction will be retrieved from a further level of memory such as level 2 cache 32 or memory 34). When a branch instruction is encountered, the fetch stage 6 may decide a next address from which to fetch instructions based on a predicted branch outcome provided by the branch predictor 40.

FIG. 4 shows that the predict stage 40 may comprise a sampled state table 404. Although shown as part of the branch predictor 40, it will be appreciated that the sampled state table may be provided elsewhere in the apparatus. The sampled state table 404 stores sampled values of register operands which have been sampled at a sampling point in program flow, such as in response to a misprediction of a branch instruction. The sampled state table may be provided in some examples with a limited number of bits to reduce area and power overhead (e.g., in one example the sampled state table provides 32 bits of storage). The sampled values may be provided to the sampled state table by sampling circuitry 402. In some examples, the values are sampled in response to mispredicted branches and therefore it may be branch resolution circuitry (which already has access to source and destination register operands of currently executing branch instructions) which provides sampled register values to the sampled state table. The selection of register operands sampled by the sampled state table is not particularly limited. In some examples, all of the registers may be sampled, although in practice to reduce the amount of storage required only a subset of registers determined to be relevant to a particular series of instructions may be sampled. As they may already be available to sampling circuitry 402 at the time of misprediction of the first branch instruction (if the sampling circuitry 402 is provided by execute circuitry), the set of sampled registers may include registers which are operands of the first branch instruction.

For example, early decode circuitry 408 may be provided to decode instructions in advance and identify which register operands to sample based on the likelihood that those register operands will have utility in predicting the outcome of a future branch instruction. Alternatively, the selection of register operands to sample may be set in advance (e.g., by a programmer) for a particular segment of code based on determining in advance which register operands would be most likely to be correlated to the outcome of a branch instruction encountered after a sampling point.

The predict circuitry 40 also includes a semantic prediction cache 400. In some examples the correlation between a particular function of sampled register values and the outcome of a future branch instruction may be stronger than the correlation between a sampled register value itself and the outcome of the future branch instruction. The functions may include manipulating and/or combining several sampled register operands in various different ways. The correlations between functions of sampled registers and branch outcomes are complex and may be difficult to predict, and therefore the predictor may be trained using a set of several different functions of sampled register state to determine whether any of those functions of sampled register values are correlated with the outcome of a particular branch instruction. If a function of sampled register values is found to be correlated to the outcome of a branch instruction then that function can be used to predict the outcome of the branch instruction.

The semantic prediction cache 400 enables a plurality of functions to be trained to determine whether they can be used to predict a particular branch instruction, by keeping track of a confidence indication for each functions of register state for that branch instruction. An entry may be provided in the semantic prediction cache 400 for each combination of a branch instruction to be predicted and, possibly: a particular preceding branch instruction which was mispredicted to cause the sampling, a particular choice of sampled register operands, and/or a particular sequence of intervening instructions between the sampling point and the future branch instruction. The confidence indications each indicate the likelihood that a particular function is correlated to the outcome of the branch instruction associated with that entry (in the particular circumstances associated with that entry), and can be updated based on observed branch outcomes (of branches determined at the execute stage) and determining whether the observed outcome matches an outcome predicted using the particular function. If a particular function of sampled register predicted the same outcome as the observed outcome, then the confidence may be increased to indicate that that function of sampled register state is more likely to be correlated to the outcome of the branch instruction. If on the other hand the function predicted a different outcome, then the confidence may be decreased.

A function may be used to predict an outcome for a branch instruction once its confidence indication has exceeded a particular threshold. The threshold could for example correspond to an accuracy of an alternative branch prediction mechanism, such that prediction based on the sampled register values is only enabled for a particular branch instruction when it is likely to lead to a more accurate prediction. If for a given branch instruction there is more than one function exceeding the threshold then the highest confidence function may be used.

In the example of FIG. 4, a predicted outcome for a branch instruction may be made using a semantic value table 406. The semantic value table 406 comprises semantic value entries which store previously observed branch outcomes. The entries may comprise a tag formed by performing a particular function of register state sampled for the corresponding branch instruction, and indicate which branch outcome was observed when that tag was calculated.

To make a prediction for a branch instruction, the semantic prediction cache 400 is looked up to identify the best function. That function, in addition to the sampled register operands in the sampled state table 404, is used to calculate a lookup value. The semantic value table 406 is looked up using the lookup value, and if an entry is identified then the outcome indicated in that entry is used as the predicted branch outcome. The table indicates the branch outcome that was observed last time the branch instruction was encountered in the same circumstances, and hence provides a prediction for the branch outcome. It will be appreciated that other mechanisms could be used to provide a prediction using a function of sampled register values, once it has been determined that said function is correlated with a branch outcome.

Shown below are examples of code segments for which the apparatus shown in FIG. 4 can be used to make a prediction of a branch outcome.

In a first example, a code segment may include the following instructions:
ADD x9, x9, #1
CMP x9, x8
B.HI 0xffffff0d8f2d4
LDR x12, [x11, x9, LSL #3]
CBZ x12, 0xffffff0d8f278 (mispred—sample x9 and x11)
ADD x9, x9, #1
CMP x9, x8
B. HI 0xffffff0d8f2d4
LDR x12, [x11, x9, LSL #3]
CBZ x12, 0xffffff0d8f278 (predict using sampled values)

The branch instruction CBZ will test the value of a register operand (x12 in both instances shown above), and will branch to the indicated address if that register has the value zero. In the example above, the first CBZ instruction is mispredicted and this therefore causes sampling of registers x9 and x11. x9 and x11 are both registers which are used to load a value into x12, upon which the outcome of the second CBZ x12 instruction depends. Between the time that x9 and x11 are sampled on misprediction of the first instance of CBZ and the later point in time where the second CBZ instruction is executed, x9 has been modified slightly due to an addition of an immediate value. Nevertheless, the sampled values of x9 and x11 are likely to be correlated in some way (potentially it is a particular combination of x9 and x11 that is correlated) to the outcome of the CBZ x12 instruction. Hence, the sampled values of x9 and x11 may be used in some combination to predict the outcome of the second CBZ x12 instruction.

Note that the second CBZ can be predicted because the pipeline was flushed after misprediction of the first CBZ. The code segment above shows the executed instruction, and does not show the incorrect path which would have been fetched after the first CBZ instruction and which would have been flushed from the pipeline. If the first CBZ had not been mispredicted (and the flow path were as shown) then sampling x9 and x11 at the time of execution of the first CBZ would have been far too late to be used to predict the outcome of the second CBZ, and sampling x9 and x11 at the time of prediction of the second CBZ would not have given an accurate prediction due to the large number of instructions which would have modified x9 and x11 before execution of the second CBZ.

In a second example, the code segment may be as follows:
ADD x24, x24, #8
CMP x24, x25
B.CC 0x400000124268 (mispredict—sample x24 and x25)
LDP w8, w9, [x24, #0]
ORR w8, w9, w8
TST w8, #0x80808080
B.NE 0x400000124284
ADD x24, x24, #8
CMP x24, x25
B.CC 0x400000124268 (predict using sampled x24 and x25)

In the second example, the branch instruction B.CC is shown. B.CC (branch if carry is clear) checks a carry flag in a control register (e.g., the current program status register CPSR) which indicates the outcome of a previous instruction (such as the compare instruction CMP). When the first B.CC is mispredicted, x24 and x25 are sampled. The sampled values of x24 and x25 can then be used to predict the outcome of the next instance of B.CC. In the code segment shown above x24 is modified by addition, but there are no loads or other instructions which may modify x24 and x25 in an unpredictable way and therefore the sampled values are anticipated to be highly correlated to the outcome of the branch instruction provided by the second instance of B.CC.

A third example is shown below:
B.PL 0x402560 (mispredict—sample x8)
LDR x8, [x8, #8]
ADD x22, x22, #1
CBNZ x8, 402544
LDR x12, [x8, #0]
LDR x11, [x12, #0x10]
LDR x12, [x12, #0x40]
LDRSW x13, [x11, #0x64]
ADD x12, x12, x13
. . . (excluded for clarity)
LDR x12, [x11, #0]

```
LDR x13, [x9, #0]
SUB x12, x13, x12
ADDS x12, x12, #0x1e
B.PL 0x402560 (predict using sampled value of x8)
```

In the example shown above, x8 is correlated to the outcome of the second B.PL (branch if plus) instruction. This is because the sampled value of x8 is used to load a value into the register x12, which is in turn used (indirectly) in the ADDS instruction. The ADDS instruction updates the N, Z, C, and V status flags in the APSR control register (application processor status register). The outcome of the B.PL conditional branch instruction depends on the value of the N (negative) flag (because if the addition result is negative then N=1, and B.PL branches if N=0), and therefore the outcome of the second B.PL instruction is correlated with the sampled value of x8, meaning that the sampled value of x8 may be used to predict the outcome of the second B.PL instruction. The example serves to illustrate that a relatively large number of intervening instructions between sampling and the later branch instruction may be permitted whilst still maintaining correlation between the sampled value and the later branch outcome. In a simulated code sequence in which the sampled value x8 was used to predict the outcome of B.PL, sampling x8 in the way shown above led to over 95% prediction accuracy over more than 20,000 predictions.

Figure 5:
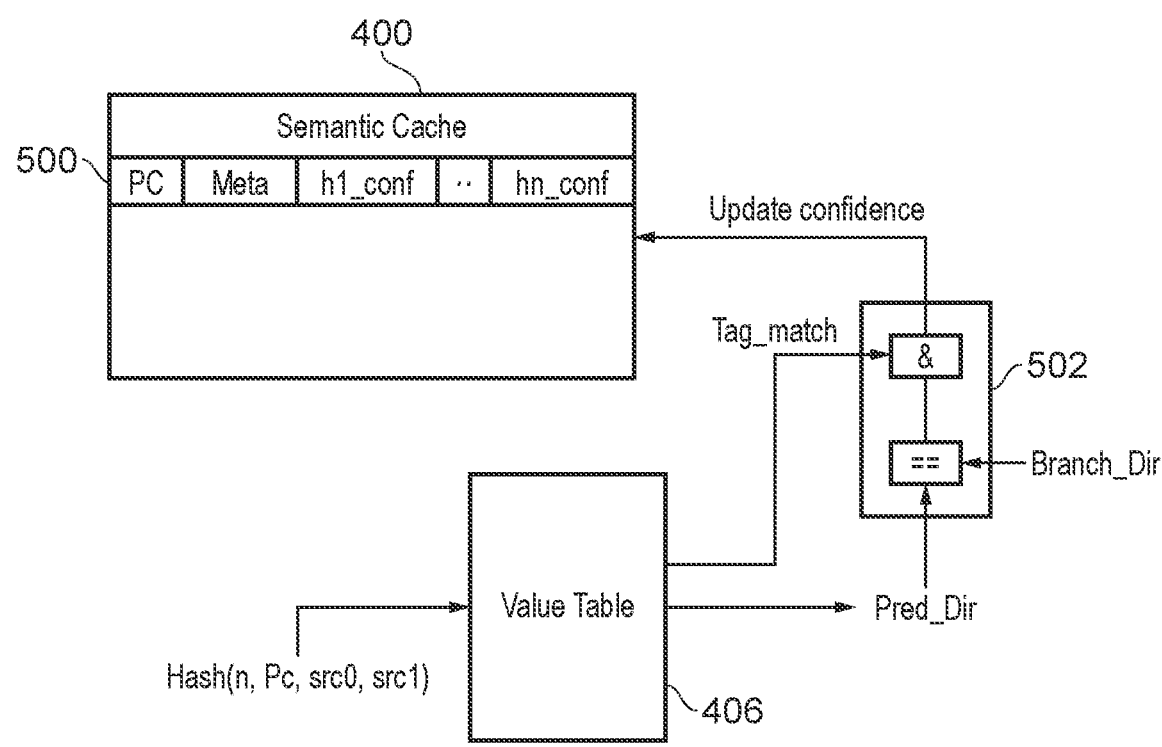
FIG. 5 illustrates an example process of updating a correlation prediction table according to aspects of the present technique.

FIG. 5 illustrates an example of updating confidence indications provided in an entry 500 of the semantic prediction cache 400. As will be discussed further below, the semantic value table 406 (or other prediction mechanism) is used to provide a predicted branch outcome for a particular branch instruction using a particular function of sampled register state, causing a predicted branch direction to be output. Following the branch instruction reaching the execute stage the correct branch outcome for the branch instruction is determined. Prediction cache update circuitry 502 determines whether the predicted direction equals the correct direction. The prediction circuitry may also check that the lookup in the semantic value table 406 hit (to filter out incorrect updates resulting from misses in the semantic value table). In response to determining that the predicted and correct branch directions agree, the update circuitry 502 is configured to increase the confidence indication for the function used to provide the prediction. In response to determining that the predicted and correct branch directions disagree, the update circuitry is configured to reduce the confidence indication for the function used to provide the prediction.

Figure 6:
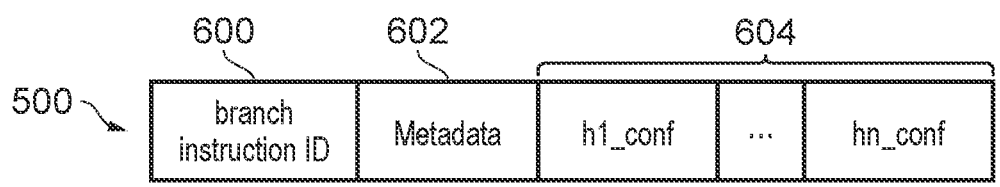
FIG. 6 illustrates an example coding of a correlation prediction entry.

FIG. 6 provides an example encoding for an entry 500 of the semantic prediction cache 400. The entry 500 comprises a field 600 identifying a branch instruction corresponding to the entry. The branch instruction identified by the field 600 is the branch instruction which may be predicted using the entry 500. The field 600 may indicate, for example, an address of the branch instruction or a tag based on the address. The entry 500 may also comprise one or more metadata fields 602 indicating one or more further attributes associated with the entry. A lookup may only hit against a particular entry if the lookup matches information in both the field 600 and the field(s) 602.

The metadata field(s) 602 may, for example, indicate a first mispredicted branch instruction. Several entries may be provided for each branch instruction reached after mispredicting different earlier branch instructions, as the same instruction may be predicted in different ways depending on how it is reached. A lookup in the semantic prediction cache to predict a particular branch instruction encountered after mispredicting a first branch instruction may only hit against a particular entry if both the first branch instruction and branch instruction to be predicted match the entry.

The metadata field(s) 602 may also, or alternatively, indicate a particular sequence of instructions between the first and future branch instructions (e.g., by indicating a hash of the intervening instructions), and/or may indicate which register operands were sampled at the sampling point.

The entry 500 also comprises one or more confidence indication fields 604. Each confidence indication corresponds to a particular function, which may be indicated explicitly but in the example of FIG. 6 is implicit. Each function is a particular way of using the sampled register state to arrive at a predicted branch outcome, such as an identity function, addition, subtraction, and so on. Each confidence indication field 604 indicates a likelihood that the branch instruction corresponding to the entry 500 can be accurately predicted using the corresponding function of sampled register values. The confidence values 604 can be updated as shown in FIG. 5.

Figure 7:
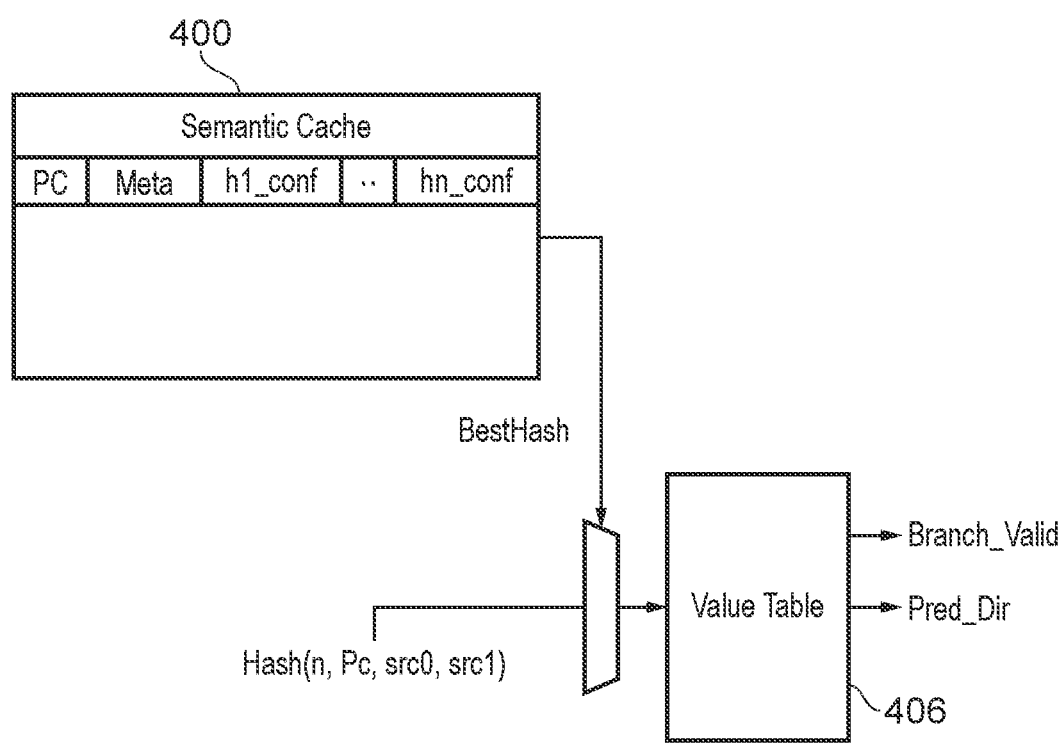
FIG. 7 illustrates an example process of predicting a branch outcome according to aspects of the present technique.

FIG. 7 illustrates an example of making a prediction using the semantic value table 406. The semantic value table 406 stores the last outcome observed for each of the used correlation functions when using the sampled register values. A hash of the following information may be used to index into the semantic value table 406 to identify an entry which can be used to form the prediction: a function number n (0, 1, 2, . . . ) corresponding to the functions represented in the semantic prediction cache entries, an address (program counter address PC) and direction of a first branch instruction, an address of the branch instruction to be predicted, a hash of the sampled register state. An entry 500 in the semantic prediction cache 400 corresponding to the branch instruction to be predicted is used to select which function n should be used in the hash used to look up the value table. If the lookup hits in the semantic value table 406, then the previously observed outcome identified in the hit entry is output as the predicted direction of the future branch instruction.

Figure 8:
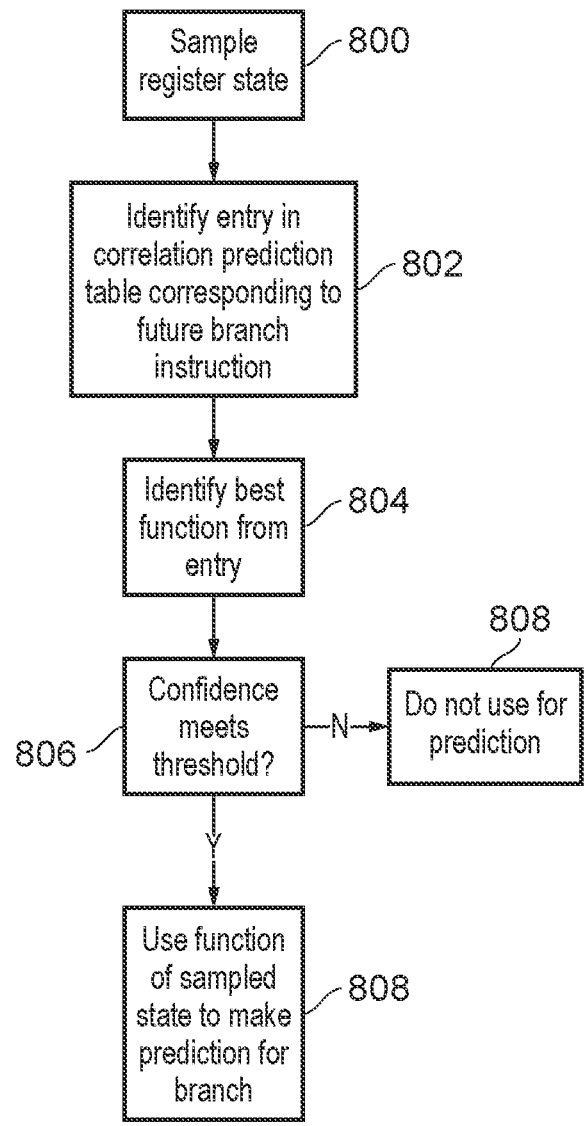
FIG. 8 illustrates a method of using a correlation prediction table to make a branch prediction.

FIG. 8 is a flow diagram schematically illustrating a method of making a prediction according to aspects of the present technique. At step 800 the values of one or more registers are sampled and stored to the sampled state table 404. This sampling may be performed in response to a determination by the execute stage that a first branch instruction has been mispredicted, causing a pipeline flush to also be carried out. The sampled register values are therefore more likely to be correlated with the outcomes of branch instructions at the predict stage than if there were many instructions in the pipeline.

At step 802 a future branch instruction is identified, and the prediction circuitry performs a lookup in the correlation prediction table (semantic prediction cache) 400. The lookup may be performed using the address of the branch instruction to be predicted, the address of the branch instruction which was mispredicted to trigger sampling at step 800, an indication of the sampled registers, and so on. If no entry is identified then prediction cannot be carried out using the sampled register values. However, if an entry is identified in the semantic prediction cache 400 then at step 804 the confidence indications provided in that entry are compared to identify the function which provides the highest confidence of a correlation between the function and the branch outcome.

At step 806 it is determined whether the highest confidence indication provided by the correlation table entry meets a threshold confidence required to make a prediction.

Figure 9:
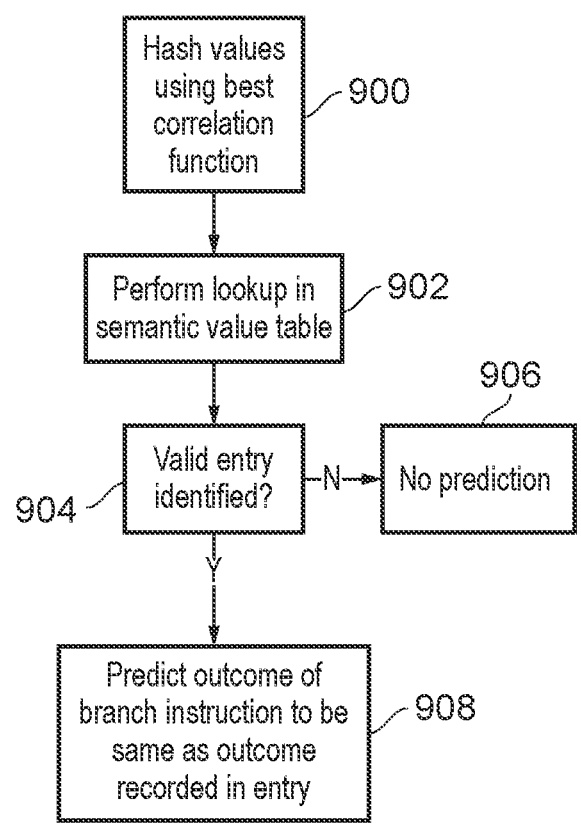
FIG. 9 illustrates a method of using a semantic value table to make a branch prediction.

If not, then it is likely that a more accurate prediction can be made using an alternative prediction mechanism and therefore at step 808 the sampled state values are not used to predict an outcome of the branch instruction. However, if at step 806 it is found that the confidence meets the threshold, then at step 808 the function of register state is used to make a prediction of the outcome of the branch instruction. As shown in FIGS. 7 and 9, in one example this involves a lookup in a semantic value table to determine the last branch outcome observed for the correlation function when using the same sampled register values, although other options are available.

FIG. 9 is a flow diagram providing an example method for calculating a prediction using the semantic value table. At step 900, a hash is calculated as shown in FIG. 7, using a combination of a branch instruction to be predicted, sampled register values, a particular choice of correlation function, and so on. At step 902 the semantic value table is looked up using the hash calculated in step 900. At step 904 it is determined whether a valid entry is identified in the semantic value table. If not, then at step 906 no prediction is made (the semantic value table outputs a signal indicating that any prediction result is invalid). However, if an entry is identified then at step 908 the branch outcome of the branch instruction is predicted to be the same as the outcome recorded in the hit entry.

Figure 10:
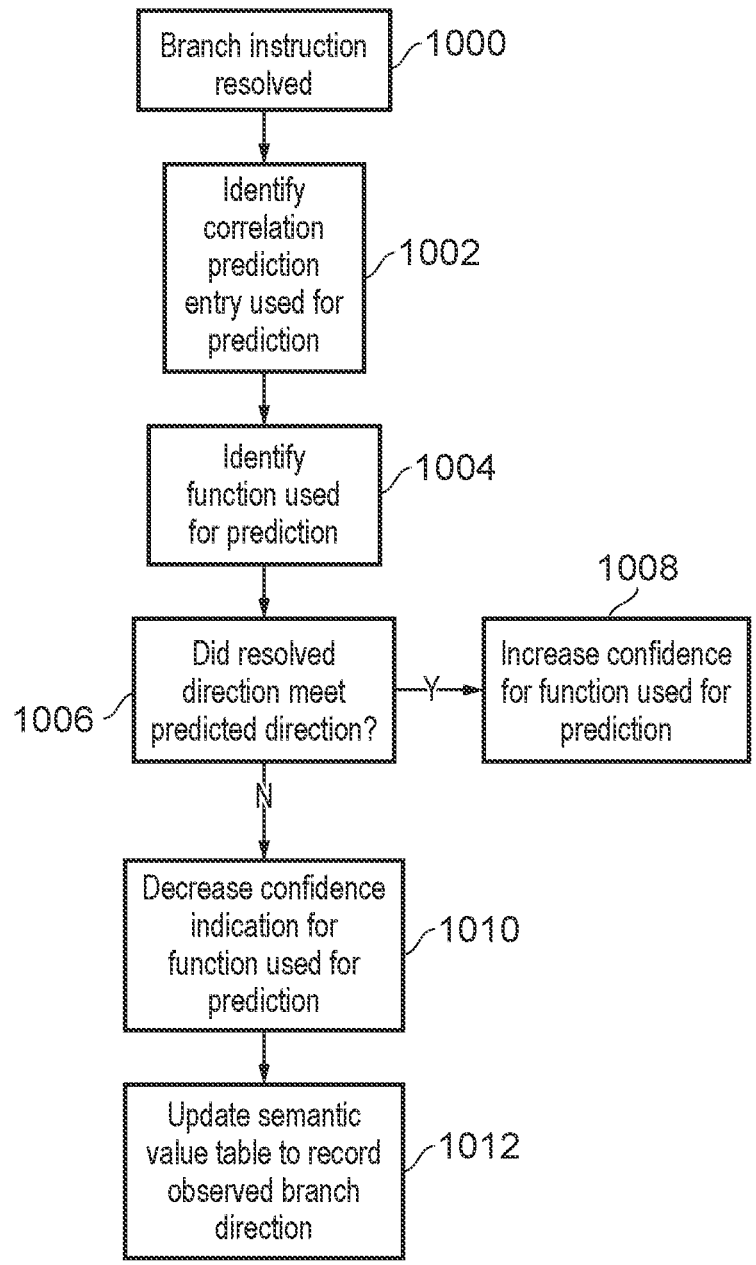
FIG. 10 illustrates a method of updating a correlation prediction table.

FIG. 10 is a flow diagram providing an example method for updating the correlation prediction table in response to a branch outcome.

At step 1000 a branch outcome is determined for a branch instruction by the execute stage 40 of a processing pipeline. The execute stage for example checks the value of register operands of the branch instruction to determine whether the branch is to be taken or not taken.

The branch instruction for which the outcome was determined at step 1000 is a branch instruction for which the outcome was also predicted based on register values sampled in response to an earlier misprediction (see FIG. 8). At step 1002 it is determined which correlation prediction entry was used for that prediction (in step 802), and in step 1004 which specific function was used to make the prediction (which function was selected in step 804).

At step 1006 it is determined whether the branch outcome determined at step 1000 matched the predicted branch direction obtained using the function identified in step 1004. If so, then at step 1008 the confidence indication for that function is increased. Because the predicted outcome matched the observed outcome, the confidence can be increased that the correlation function used for the prediction is correlated with the branch outcome, and therefore is more likely to be useful for predicting the branch outcome.

If the predicted and observed branch outcomes disagree at step 1006, then at step 1010 the confidence indication for the function is decreased. This does not necessarily mean that the function cannot be used for predicting the outcome of the branch instruction, as the function may generally be correlated with the branch outcome. As the series of instructions between sampling point and branch instruction can include loads (and other unpredictable instructions) there is a possibility for an otherwise strong correlation to be incorrect on occasion. There may therefore be a confidence mechanism provided which allows some degree of leeway, such that decreasing the confidence may not prevent the function from being used for prediction.

In addition to updating the correlation prediction table 400, circuitry may also be provided to update the semantic value table 406. Hence, in one example, at step 1012 the semantic value table is updated to record the branch outcome observed at step 1000. If there is an existing entry having the same tag (the same hash of values shown in FIG. 7, for example) then that entry may be replaced such that the semantic value table includes the most recent observed outcome for a particular correlation function when using particular sampled register values.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 11:
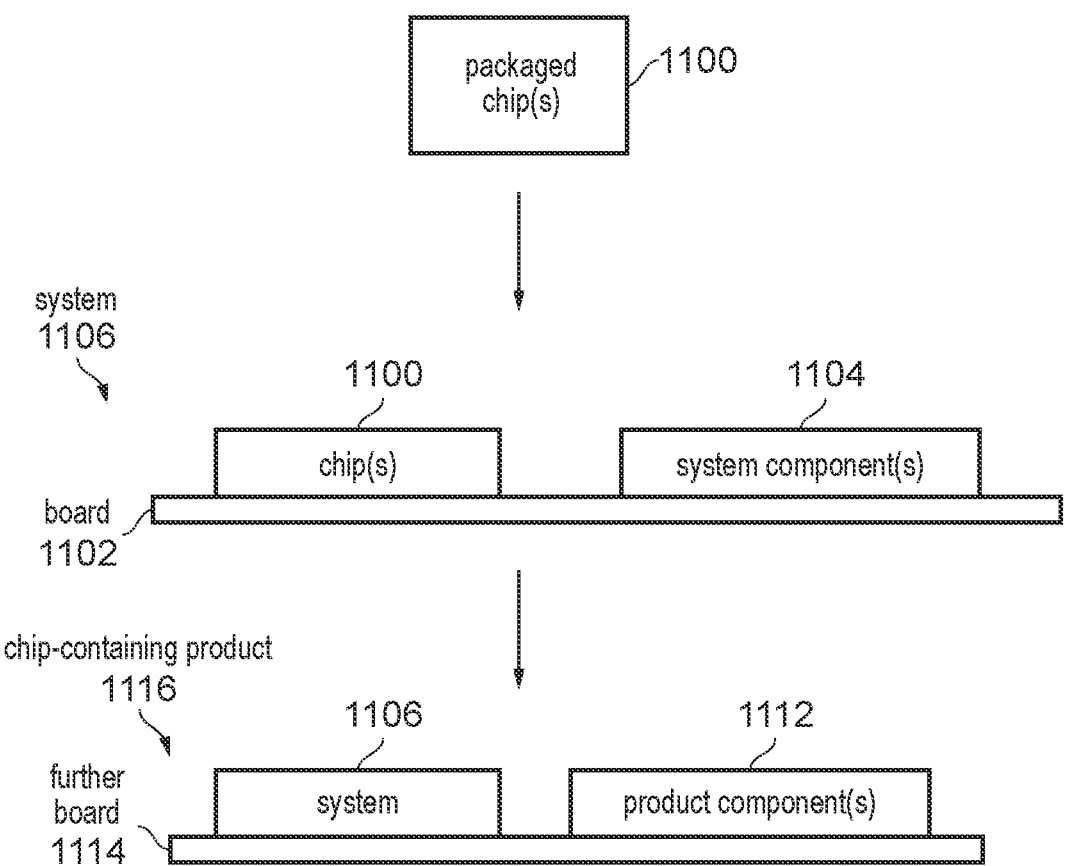
FIG. 11 illustrates a system and a chip-containing product.

As shown in FIG. 11, one or more packaged chips 1100, with the apparatus described above implemented on one chip or distributed over two or more of the chips, are manufactured by a semiconductor chip manufacturer. In some examples, the chip product 1100 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 1100 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. chips which form part of a larger chip and which are manufactured separately) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 1100 are assembled on a board 1102 together with at least one system component 1104 to provide a system 1106. For example, the board may comprise a printed circuit board. The board substrate may be made of any of a variety of materials, e.g. plastic, glass, ceramic, or a flexible substrate material such as paper, plastic or textile material. The at least one system component 1104 comprise one or more external components which are not part of the one or more packaged chip(s) 1100. For example, the at least one system component 1104 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1116 is manufactured comprising the system 1106 (including the board 1102, the one or more chips 1100 and the at least one system component 1104) and one or more product components 1112. The product components 1112 comprise one or more further components which are not part of the system 1106. As a non-exhaustive list of examples, the one or more product components 1112 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1106 and one or more product components 1112 may be assembled on to a further board 1114.

The board 1102 or the further board 1114 may be provided on or within a device housing or other structural support (e.g. a frame or blade) to provide a product which can be handled by a user and/or is intended for operational use by a person or company.

The system 1106 or the chip-containing product 1116 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

(1) An apparatus, comprising:
sampled state storage configured to store sampled register state of at least one register operand sampled at a sampling point in program flow;
a correlation prediction table to store at least one correlation prediction entry, each correlation prediction entry providing at least one confidence indication for a corresponding branch instruction;
wherein each confidence indication indicates a likelihood that a corresponding function of register state sampled at the sampling point correlates to a branch outcome for the corresponding branch instruction when said branch instruction is executed at a later point in program flow; and
prediction circuitry, wherein in response to a determination that a particular branch instruction later in program flow than the sampling point has a corresponding correlation prediction entry and that the corresponding correlation prediction entry provides a confidence indication meeting a prediction criterion, the prediction circuitry is configured to make a prediction of a branch outcome for the particular branch instruction based on performing a particular function of register state sampled at the sampling point, the particular function corresponding to the confidence indication meeting the prediction criterion.

(2) The apparatus according to clause 1, wherein an encoding of the correlation prediction entry indicates a plurality of confidence indications corresponding to different functions of the register state.

(3) The apparatus according to clause 2, wherein in response to a determination that the corresponding correlation prediction entry provides two or more confidence indications meeting the prediction criterion, the prediction circuitry is configured to make the prediction based on performing a function corresponding to the confidence indication indicating the highest likelihood.

(4) The apparatus according to any preceding clause, wherein the correlation prediction table is configured to provide at least one confidence indication corresponding to the identity function of a value of a sampled register operand.

(5) The apparatus according to any preceding clause, wherein the correlation prediction table is configured to provide at least one confidence indication corresponding to a function combining values from a plurality of sampled register operands.

(6) The apparatus according to any preceding clause, comprising a semantic value table configured to store at least one semantic value entry, each semantic value entry indicating a previously observed outcome for a particular combination of a branch instruction and a function of sampled register state;
wherein the prediction circuitry is configured to make the prediction of a branch outcome for the particular branch instruction based on performing a lookup of the semantic value table using the particular function of register state sampled at the sampling point.

(7) The apparatus according to clause 6, comprising semantic value table update circuitry configured to update the semantic value table based on an observed outcome of a branch instruction.

(8) The apparatus according to any preceding clause, wherein sampling of the at least one register operand is triggered by misprediction of a first branch instruction.

(9) The apparatus according to any preceding clause, wherein the prediction circuitry is configured to determine that the particular branch instruction corresponds to a correlation prediction entry based on an address of the particular branch instruction.

(10) The apparatus according to any preceding clause, wherein the prediction circuitry is configured to determine that the particular branch instruction corresponds to a correlation prediction entry based on a comparison between: a path through program flow from the sampling point to the particular branch instruction, and a path indicated in the correlation prediction entry.

(11) The apparatus according to any preceding clause, wherein the prediction circuitry is configured to determine that the particular branch instruction corresponds to a correlation prediction entry based on which operands were sampled at the sampling point.

(12) The apparatus according to any preceding clause, comprising correlation prediction table update circuitry to update the at least one confidence indication of a particular correlation prediction entry, based on a measured branch outcome for the corresponding branch instruction.

(13) The apparatus according to clause 12, wherein the likelihood indicated by a particular confidence indication is increased in response to determining that the particular function of register state associated with the particular confidence indication correctly predicted the branch outcome for the corresponding branch instruction.

(14) The apparatus according to any preceding clause, wherein the prediction circuitry is configured to make a prediction for the particular branch outcome irrespective of whether the path through program flow from the sampling point to the particular branch instruction comprises at least one instruction having an outcome which depends on information other than the sampled register state.

(15) The apparatus according to clause 14, wherein the prediction circuitry is configured to make a prediction for the particular branch outcome irrespective of whether the path through program flow from the sampling point to the particular branch instruction comprises at least one load instruction.

(16) The apparatus according to any preceding clause, wherein the prediction criterion is met for a particular confidence indication when the particular confidence indication exceeds a threshold value.

(17) A non-transitory computer-readable medium to store computer-readable code for fabrication of the apparatus of any preceding clause.

(18) A system comprising:
the apparatus of any preceding clause, implemented in at least one packaged chip;
at least one system component; and
a board,
wherein the at least one packaged chip and the at least one system component are assembled on the board.

(19) A chip-containing product comprising the system of clause 18 assembled on a further board with at least one other product component.

(20) A method, comprising:
storing sampled register state of at least one register operand sampled at a sampling point in program flow;
storing at least one correlation prediction entry, each correlation prediction entry providing at least one confidence indication for a corresponding branch instruction;
wherein each confidence indication indicates a likelihood that a corresponding function of register state sampled at the sampling point correlates to a branch outcome for the corresponding branch instruction when said branch instruction is executed at a later point in program flow; and
in response to a determination that a particular branch instruction later in program flow than the sampling point has a corresponding correlation prediction entry and that the corresponding correlation prediction entry provides a confidence indication meeting a prediction criterion, making a prediction of a branch outcome for the particular branch instruction based on performing a particular function of register state sampled at the sampling point, the particular function corresponding to the confidence indication meeting the prediction criterion.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus, comprising:
   sampled state storage configured to store sampled register state of at least one register operand sampled at a sampling point in program flow;
   a correlation prediction table to store at least one correlation prediction entry, each correlation prediction entry providing at least one confidence indication for a corresponding branch instruction;
   wherein each confidence indication indicates a likelihood that a corresponding function of register state sampled at the sampling point correlates to a branch outcome for the corresponding branch instruction when said branch instruction is executed at a later point in program flow; and
   prediction circuitry, wherein in response to a determination that a particular branch instruction later in program flow than the sampling point has a corresponding correlation prediction entry and that the corresponding correlation prediction entry provides a confidence indication meeting a prediction criterion, the prediction circuitry is configured to make a prediction of a branch outcome for the particular branch instruction based on performing a particular function of register state sampled at the sampling point, the particular function corresponding to the confidence indication meeting the prediction criterion.

2. The apparatus according to claim 1, wherein an encoding of the correlation prediction entry indicates a plurality of confidence indications corresponding to different functions of the register state.

3. The apparatus according to claim 2, wherein in response to a determination that the corresponding correlation prediction entry provides two or more confidence indications meeting the prediction criterion, the prediction circuitry is configured to make the prediction based on performing a function corresponding to the confidence indication indicating the highest likelihood.

4. The apparatus according to claim 1, wherein the correlation prediction table is configured to provide at least one confidence indication corresponding to the identity function of a value of a sampled register operand.

5. The apparatus according to claim 1, wherein the correlation prediction table is configured to provide at least one confidence indication corresponding to a function combining values from a plurality of sampled register operands.

6. The apparatus according to claim 1, comprising a semantic value table configured to store at least one semantic value entry, each semantic value entry indicating a previously observed outcome for a particular combination of a branch instruction and a function of sampled register state;
   wherein the prediction circuitry is configured to make the prediction of a branch outcome for the particular branch instruction based on performing a lookup of the semantic value table using the particular function of register state sampled at the sampling point.

7. The apparatus according to claim 6, comprising semantic value table update circuitry configured to update the semantic value table based on an observed outcome of a branch instruction.

8. The apparatus according to claim 1, wherein sampling of the at least one register operand is triggered by misprediction of a first branch instruction.

9. The apparatus according to claim 1, wherein the prediction circuitry is configured to determine that the particular branch instruction corresponds to a correlation prediction entry based on an address of the particular branch instruction.

10. The apparatus according to claim 1, wherein the prediction circuitry is configured to determine that the particular branch instruction corresponds to a correlation prediction entry based on a comparison between: a path through program flow from the sampling point to the particular branch instruction, and a path indicated in the correlation prediction entry.

11. The apparatus according to claim 1, wherein the prediction circuitry is configured to determine that the particular branch instruction corresponds to a correlation prediction entry based on which operands were sampled at the sampling point.

12. The apparatus according to claim 1, comprising correlation prediction table update circuitry to update the at least one confidence indication of a particular correlation prediction entry, based on a measured branch outcome for the corresponding branch instruction.

13. The apparatus according to claim 12, wherein the likelihood indicated by a particular confidence indication is increased in response to determining that the particular function of register state associated with the particular confidence indication correctly predicted the branch outcome for the corresponding branch instruction.

14. The apparatus according to claim 1, wherein the prediction circuitry is configured to make a prediction for the particular branch outcome irrespective of whether the path through program flow from the sampling point to the particular branch instruction comprises at least one instruction having an outcome which depends on information other than the sampled register state.

15. The apparatus according to claim 14, wherein the prediction circuitry is configured to make a prediction for the particular branch outcome irrespective of whether the path through program flow from the sampling point to the particular branch instruction comprises at least one load instruction.

16. The apparatus according to claim 1, wherein the prediction criterion is met for a particular confidence indication when the particular confidence indication exceeds a threshold value.

17. A non-transitory computer-readable medium to store computer-readable code for fabrication of the apparatus of claim 1.

18. A system comprising:
    the apparatus of claim 1, implemented in at least one packaged chip;
    at least one system component; and
    a board,
    wherein the at least one packaged chip and the at least one system component are assembled on the board.

19. A chip-containing product comprising the system of claim 18 assembled on a further board with at least one other product component.

20. A method, comprising:
    storing sampled register state of at least one register operand sampled at a sampling point in program flow;

storing at least one correlation prediction entry, each correlation prediction entry providing at least one confidence indication for a corresponding branch instruction;

wherein each confidence indication indicates a likelihood that a corresponding function of register state sampled at the sampling point correlates to a branch outcome for the corresponding branch instruction when said branch instruction is executed at a later point in program flow; and in response to a determination that a particular branch instruction later in program flow than the sampling point has a corresponding correlation prediction entry and that the corresponding correlation prediction entry provides a confidence indication meeting a prediction criterion, making a prediction of a branch outcome for the particular branch instruction based on performing a particular function of register state sampled at the sampling point, the particular function corresponding to the confidence indication meeting the prediction criterion.

* * * * *